(12) United States Patent
Lathrop et al.

(10) Patent No.: US 7,336,003 B2
(45) Date of Patent: Feb. 26, 2008

(54) TRANSFER SWITCH AND POWER SYSTEM INCLUDING THE SAME

(75) Inventors: Todd M. Lathrop, Oakdale, PA (US); Derrick G. Berad, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 325 days.

(21) Appl. No.: 11/099,159

(22) Filed: Apr. 5, 2005

(65) Prior Publication Data

US 2006/0221533 A1  Oct. 5, 2006

(51) Int. Cl.
*H02J 9/00* (2006.01)
*G05D 17/02* (2006.01)

(52) U.S. Cl. .................. 307/64; 700/297; 700/298

(58) Field of Classification Search .................. 307/64; 700/297, 298
See application file for complete search history.

(56) References Cited

U.S. PATENT DOCUMENTS

| | | | |
|---|---|---|---|
| 3,396,404 A * | 8/1968 | Parker, Jr. ................... | 346/34 |
| 4,102,129 A | 7/1978 | Maes | |
| 4,314,441 A | 2/1982 | Yannone et al. | |
| 4,398,097 A | 8/1983 | Schell et al. | |
| 4,747,061 A | 5/1988 | Lagree et al. | |
| 4,760,278 A | 7/1988 | Thomson | |
| 4,894,796 A | 1/1990 | Engel et al. | |
| 5,081,367 A | 1/1992 | Smith et al. | |
| 5,210,685 A | 5/1993 | Rosa | |
| 5,397,868 A | 3/1995 | Smith et al. | |
| 5,581,133 A | 12/1996 | Smith et al. | |
| 5,638,295 A | 6/1997 | Lagree et al. | |
| 5,929,781 A | 7/1999 | Vosika | |
| 6,067,482 A | 5/2000 | Shapiro | |
| 6,097,108 A | 8/2000 | Tweed | |
| 6,172,432 B1 | 1/2001 | Schnackenberg et al. | |
| 6,181,028 B1 | 1/2001 | Kern et al. | |
| 6,191,500 B1 | 2/2001 | Toy | |
| 6,218,921 B1 | 4/2001 | Eberts et al. | |
| 6,285,178 B1 | 9/2001 | Ball et al. | |

(Continued)

OTHER PUBLICATIONS

Cutler-Hammer, "Instructions for Cutler-Hammer Genswitch Automatic Transfer Switch (30-1000 Amperes)", I.B. ATS-G003, Dec. 1998, pp. i-vii, 1-35.

(Continued)

*Primary Examiner*—Robert L. Deberadinis
*Assistant Examiner*—Hal I Kaplan
(74) *Attorney, Agent, or Firm*—Martin J. Moran

(57) ABSTRACT

A transfer switch includes first terminals adapted to input power from a first power source, second terminals adapted to input power from a second power source, third terminals adapted to output power to a first load, and a transfer mechanism adapted to selectively electrically connect the one of the first or second terminals to the third terminals. A control mechanism cooperates with the first and second terminals and the transfer mechanism to electrically connect one of the first and third terminals or the second and third terminals. A control circuit and a relay include normally closed contacts and normally open contacts. The relay is de-energized responsive to the first and third terminals being electrically connected, and energized responsive to the second and third terminals being electrically connected. The normally closed contacts shed corresponding second loads and the normally open contacts enable corresponding third loads when the relay is energized.

5 Claims, 4 Drawing Sheets

U.S. PATENT DOCUMENTS

| | | | |
|---|---|---|---|
| 6,528,745 | B1 | 3/2003 | Lathrop et al. |
| 6,559,559 | B2 | 5/2003 | Cratty |
| 6,563,233 | B1 | 5/2003 | Hinks |
| 6,577,216 | B2 | 6/2003 | Turner et al. |
| 6,590,481 | B2 | 7/2003 | Turner et al. |
| 6,611,068 | B2 | 8/2003 | Cratty |
| 6,801,109 | B2 | 10/2004 | Simms |
| 6,849,967 | B2 | 2/2005 | Lathrop et al. |
| 2003/0042794 | A1 | 3/2003 | Jarrett, Jr. |
| 2003/0075982 | A1 | 4/2003 | Seefeldt |

OTHER PUBLICATIONS

Eaton Corporation, "Case Study: Notre Dame Peak Shaving", www.ch.cutler-hammer.com, Jan. 2003, 4 pp.

Eaton Corporation, "Reduce Energy and Operating Costs", http://www.pps2.com/Internet/ReduceCosts/, 2003, 2 pp.

Caterpillar, "Uninterruptible Power Supply (UPS)", http://www.cat.com/cda/layout?m=37516&x=7, 2004, 1 p.

Caterpillar, "Product Information", http://www.cat.com/cda/components/fullArticle?m=37512&x=7&id=143172&languageId=7, 2004, 2 pp.

Caterpillar, "Automatic Transfer Switches", http://www.cat.com/cda/layout?m=37512&x=7, 2004, 3 pp.

Caterpillar, "Power Generation", http://www.cat.com/cda/layout?m=37480&x=7, 2004, 2 pp.

ASCO Power Technologies, LP, "7000 Series Soft Load", http://www.asco.com/cgi-bin/redirect.pl?/product.html, 2002, 2 pp.

* cited by examiner

TRANSFER SWITCH AND POWER SYSTEM INCLUDING THE SAME

BACKGROUND OF THE INVENTION

1. Field of the Invention

This invention pertains generally to transfer mechanisms and, more particularly, to transfer switches for selectively feeding power from one of two input lines to a load. The invention also pertains to power systems which include a transfer mechanism, such as a transfer switch.

2. Background Information

Alternate power sources are provided for any number of applications, which cannot withstand a lengthy interruption in electric power. Typically, power is provided from a primary source with back-up power provided by a secondary source. Often, the primary source is a utility power source and the secondary source is an auxiliary power source, such as an engine driven generator or a second utility source. The transfers between the two power sources can be made automatically or manually.

Transfer switches are well known in the art. See, for example, U.S. Pat. Nos. 5,397,868; 5,210,685; 4,894,796; and 4,747,061. Transfer switches operate, for example, to transfer a power consuming load from a circuit with a normal power supply to a circuit with an auxiliary power supply. Applications for transfer switches include stand-by applications, among others, in which the auxiliary power supply stands-by if the normal power supply should fail. Facilities having a critical requirement for continuous electric power, such as hospitals, certain plant processes, computer installations, and the like, have a standby power source, often a diesel generator. A transfer switch controls electrical connection of the utility lines and the diesel generator to the facility load buses. In many installations, the transfer switch automatically starts the standby generator and connects it to the load bus upon loss of utility power, and reconnects the utility power to the load bus if utility power is reestablished.

In the case of a generator driven auxiliary power source, power must be stabilized before the transfer can be made to the secondary source. In any event, the two power sources cannot be connected to the load simultaneously unless they suitably match their respective voltages, frequencies and phases. Some transfer switches affect an open transition between the power sources, that is, one is disconnected from the load bus before the other one is connected. Other transfer switches provide a closed transition wherein the one source is connected to the load bus before the other source is disconnected, in order that both power sources are connected in parallel during the transition.

Transfer switches commonly used to connect alternate power sources to a load, including networks, utilize a pair of switches each connecting one of the sources to the load. In order to prevent connecting unsynchronized sources together, the operation of the two switches is coordinated, typically by a mechanical interlock, in order that only one switch at a time can be turned on. In many instances, it is desirable to operate the transfer switch remotely. Typically, electric motors have been used to operate the interlocks on transfer switches. See, for example, U.S. Pat. Nos. 5,081,367; 4,760,278; and 4,398,097.

A transfer switch typically comprises a pair of circuit interrupters combined with a drive input and a linkage system. The preferred types of circuit interrupters have been molded-case switches and molded-case circuit breakers because these types are commercially available in a wide array of sizes and are relatively economical compared to other options. The preferred type of drive input depends on the application for the transfer switch. Usually motors are preferred, but at other times there is a clear preference for manually-operated mechanisms.

Transfer switches as applied, for example, to light commercial and residential applications are becoming popular since a number of such commercial and residential facilities find it necessary to install backup power generation systems. Furthermore, recent revisions to the National Electrical Code (NEC) require transfer equipment on all permanently installed optional standby systems. Many such transfer switches include fixed timers, voltage sensing and engine start contacts.

Underwriters Laboratories (UL) standard UL 1008 covers transfer switch equipment including automatic, non-automatic (manual) and by-pass/isolation transfer switches intended for use in ordinary locations to provide for lighting and power. Relatively low cost transfer switches that meet this standard design are suitable for many light commercial and residential applications.

It is known to provide transfer switches for dual utility power sources.

It is also known to provide a transfer switch for a utility power source and a generator power source. For example, U.S. Pat. No. 6,181,028 discloses a transfer mechanism for a utility power source and a generator power source. A monitoring circuit within a transfer mechanism cabinet is operatively connected to the utility power source and the generator power source. As is conventional, the monitoring circuit monitors the power supplied by the utility power source. In response to a power outage from the utility power source, the monitoring circuit starts the internal combustion engine of the generator power source. The starting of the internal combustion motor causes the electrical generator of the generator power source to generate electrical power.

It is also known to provide a voltage sensing generator (i.e., a generator with a voltage monitoring circuit).

U.S. Pat. No. 6,172,432 discloses an automatic transfer switch in which excess loads are automatically shed and restored when an intermittent load combination falls back to acceptable limits as configured into a microcontroller. For example, microwave ovens, water pumps and air conditioning compressors create large but intermittent and transient loads. When such loads turn off, the microcontroller automatically restores previously cut out lower priority loads. Load shedding avoids the necessity of oversizing the generator and permits a larger combination of loads to be supported by the generator than the total load rating of the generator.

U.S. Pat. No. 6,191,500 discloses that an uninterruptible power supply (UPS) system includes a plurality of UPS modules electrically coupled to at least two utility sources. Generator paralleling switchgear includes a load priority and load shedding control system that adds or reduces load on a generator bus. Each load in the UPS system has a pre-assigned wattage rating, which the control system employs to determine how many loads can be added as generators come onto the generator bus. As generators are randomly connected to the generator bus, the control system signals for connection of the loads in ascending sequential priority, with the highest priority load being connected first. All load-add steps are preceded by a time delay, adjustable from 0 to 3 seconds.

There is room for improvement in powering loads under emergency or generator back-up power conditions.

There is a need for a low cost transfer switch for use with a utility source and a voltage sensing generator, or with two generators, one of which is voltage sensing.

There is, therefore, room for improvement in transfer switches. There is also room for improvement in power systems including transfer switches.

SUMMARY OF THE INVENTION

These needs and others are met by the present invention, which provides a transfer switch including a relay energized by a control circuit responsive to second (e.g., emergency) terminals being electrically connected to third (e.g., load) terminals, such that at least one normally closed contact is adapted to shed a corresponding at least one load when the relay is energized, and at least one normally open contact is adapted to enable a corresponding at least one load when the relay is energized.

In accordance with one aspect of the invention, a transfer switch comprises: first terminals adapted to input power from a first power source; second terminals adapted to input power from a second power source; third terminals adapted to output power to a first load; a transfer mechanism adapted to selectively electrically connect either the first terminals or the second terminals to the third terminals; and a control mechanism cooperating with the first terminals, the second terminals and the transfer mechanism to cause the transfer mechanism to electrically connect one of: (i) the first terminals to the third terminals or (ii) the second terminals to the third terminals, the control mechanism comprising a control circuit and a relay including at least one normally closed contact and at least one normally open contact, the relay being de-energized by the control circuit responsive to the first terminals being electrically connected to the third terminals, the relay being energized by the control circuit responsive to the second terminals being electrically connected to the third terminals, the at least one normally closed contact being adapted to shed a corresponding at least one second load when the relay is energized, and the at least one normally open contact being adapted to enable a corresponding at least one third load when the relay is energized.

The first terminals may have a voltage, and the control mechanism may further comprise fourth terminals electrically interconnected with the first terminals, in order to output the voltage of the first terminals to the second power source.

The transfer switch may be adapted for use with a normal (e.g., utility) power source and a voltage sensing generator power source, or two generator power sources, one of which is voltage sensing.

At least one of the first and second power sources may be a voltage sensing generator power source adapted to input the voltage from the fourth terminals and start a generator responsive to the voltage.

As another aspect of the invention, a transfer switch for a first power source and a second power source comprises: first terminals adapted to input power from the first power source, the first terminals having a voltage with a magnitude; second terminals adapted to input power from the second power source; third terminals adapted to output power to a load; fourth terminals adapted to output the voltage of the first terminals to the second power source; a transfer mechanism adapted to selectively electrically connect either the first terminals or the second terminals to the third terminals; and a control mechanism cooperating with the first terminals, the second terminals and the transfer mechanism to cause the transfer mechanism to electrically connect one of: (i) the first terminals to the third terminals or (ii) the second terminals to the third terminals, wherein at least one of the first and second power sources is a voltage sensing generator power source adapted to input the voltage from the fourth terminals and start a generator responsive to the magnitude of the voltage being below a predetermined value.

One or both of the first and second power sources may be the voltage sensing generator power source.

As another aspect of the invention, a power system comprises: a first power source; a second power source comprising a voltage sensing circuit and a generator power source, the voltage sensing circuit being adapted to input a voltage and start the generator power source responsive to the voltage; and a transfer switch comprising: first terminals structured to input power from the first power source, the first terminals having the voltage, second terminals structured to input power from the second power source, third terminals adapted to output power to a load, fourth terminals outputting the voltage of the first terminals to the voltage sensing circuit of the second power source, a transfer mechanism adapted to selectively electrically connect either the first terminals or the second terminals to the third terminals, and a control mechanism cooperating with the first terminals, the second terminals and the transfer mechanism to cause the transfer mechanism to electrically connect one of: (i) the first terminals to the third terminals or (ii) the second terminals to the third terminals.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1A:
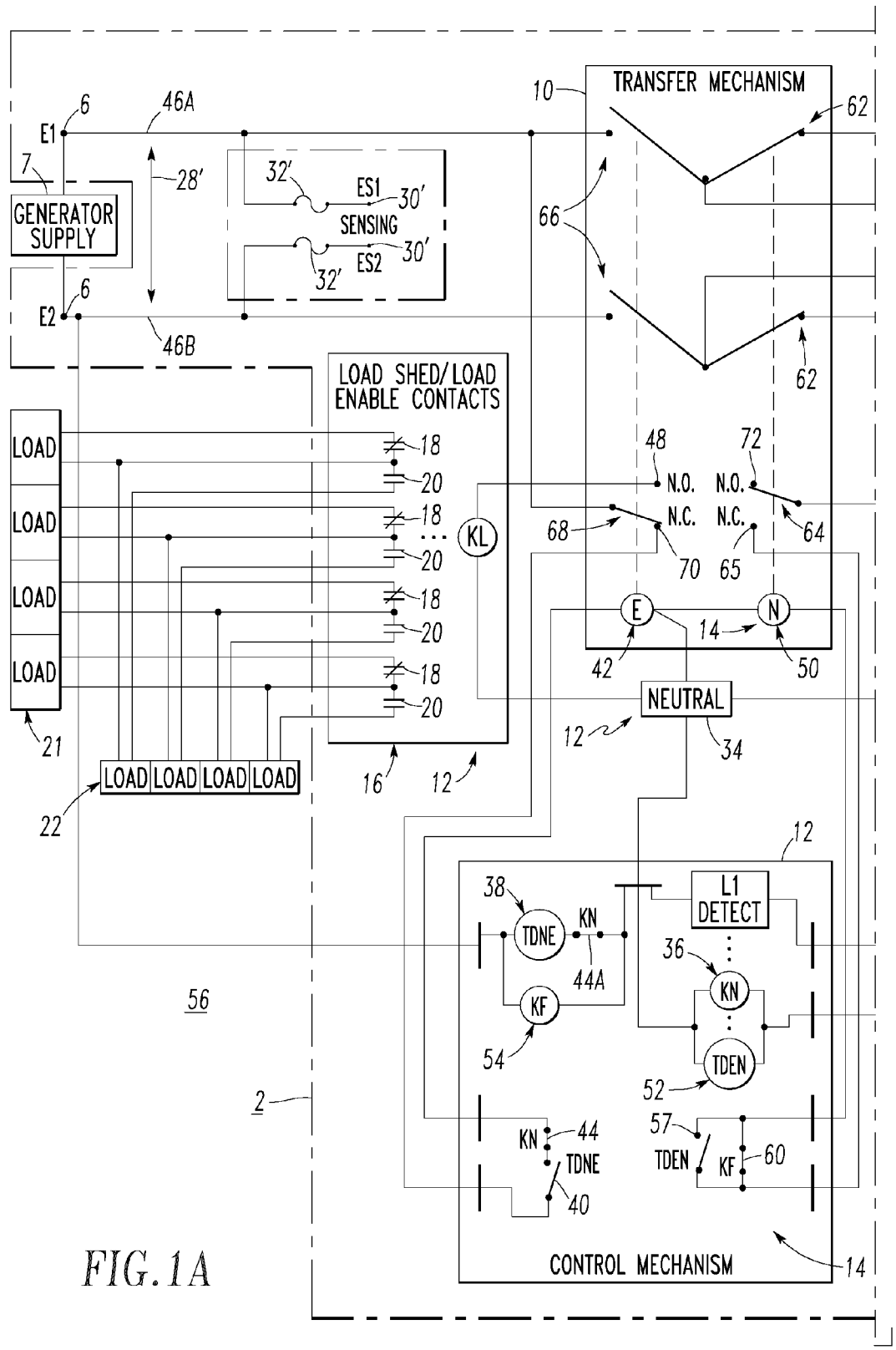
FIGS. 1A-1B form a block diagram of a transfer switch in accordance with the present invention.
Figure 1B:
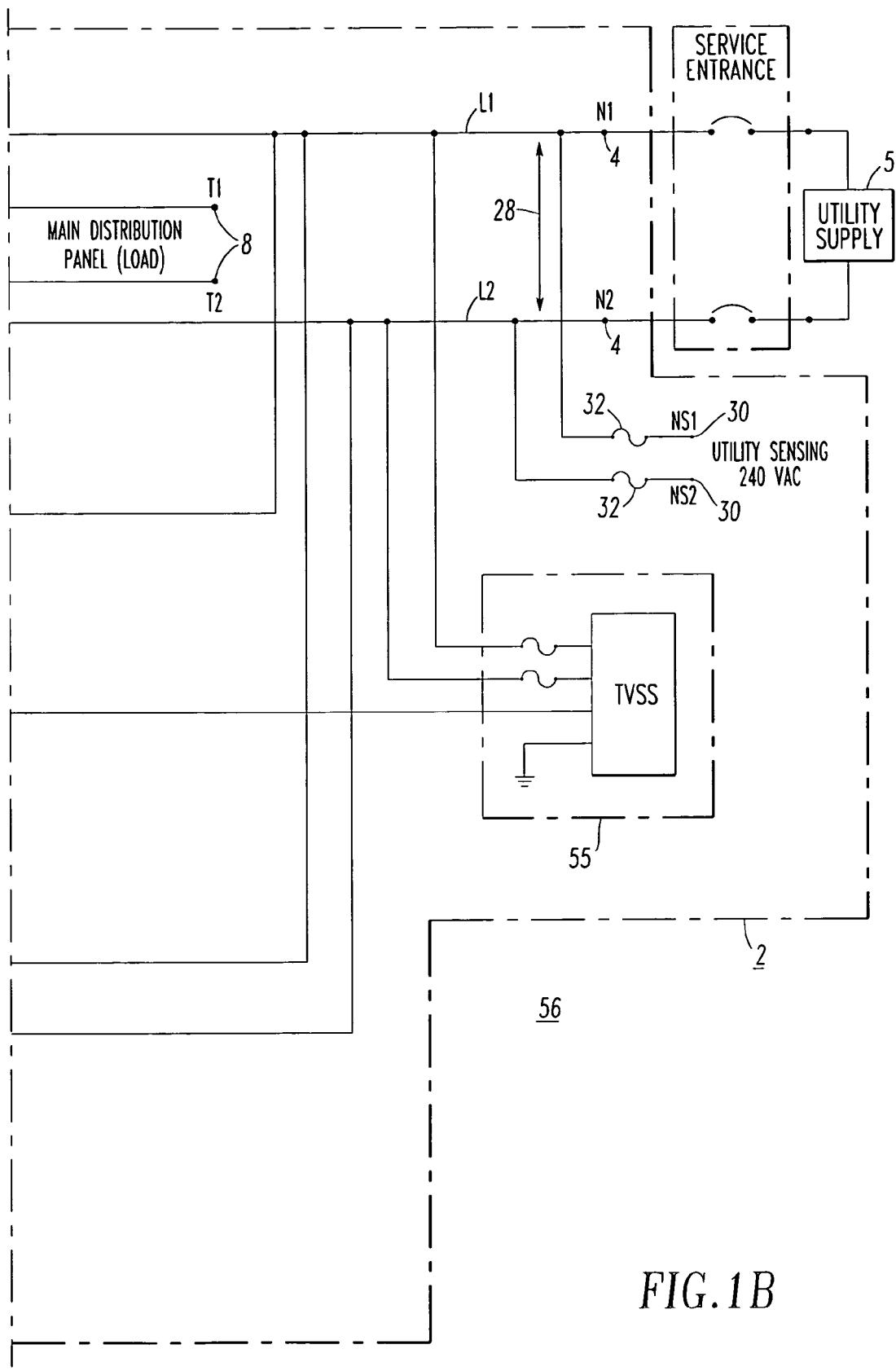

Referring to FIGS. 1A-1B, a transfer switch 2 includes first terminals 4 (N1,N2) adapted to input power from a first power source (e.g., without limitation, a 240 VAC utility supply 5), second terminals 6 (E1,E2) adapted to input power from a second power source (e.g., without limitation, a 240 VAC generator supply 7), and third terminals 8 (T1,T2) adapted to output power to a first load (e.g., without limitation, through a main distribution panel (not shown)). A transfer mechanism 10 is adapted to selectively electrically connect either the first terminals 4 or the second terminals 6 to the third terminals 8. A control mechanism 12 cooperates with the first terminals 4, the second terminals 6 and the transfer mechanism 10 to cause such transfer mechanism to electrically connect one of the first and third terminals 4,8, or the second and third terminals 6,8.

The control mechanism 12 includes a suitable control circuit 14 and a relay 16 (KL) including one or more normally closed (NC) contacts 18 (e.g., without limitation, four NC contacts 18 are shown) and one or more normally open (NO) contacts 20 (e.g., without limitation, four NO contacts 20 are shown). In this example, each pair of the NC and NO contacts 18,20 is structured as a form C contact.

Although four example circuits are disclosed with the relay 16, any suitable count of NC and NO contacts may be provided. Furthermore, one or more additional relays (not shown) may be suitably employed, in order to increase the number of NC and/or NO contacts, from which power for selected loads is shed or enabled.

The relay 16 is de-energized by the control circuit 14 responsive to the first terminals 4 being electrically connected to the third terminals 8, and is energized by the control circuit 14 responsive to the second terminals 6 being electrically connected to the third terminals 8. The NC contacts 18 are adapted to shed corresponding one or more second loads 21 when the relay 16 is energized. The NO contacts 20 are adapted to enable corresponding one or more third loads 22 when the relay 16 is energized.

Figure 2:
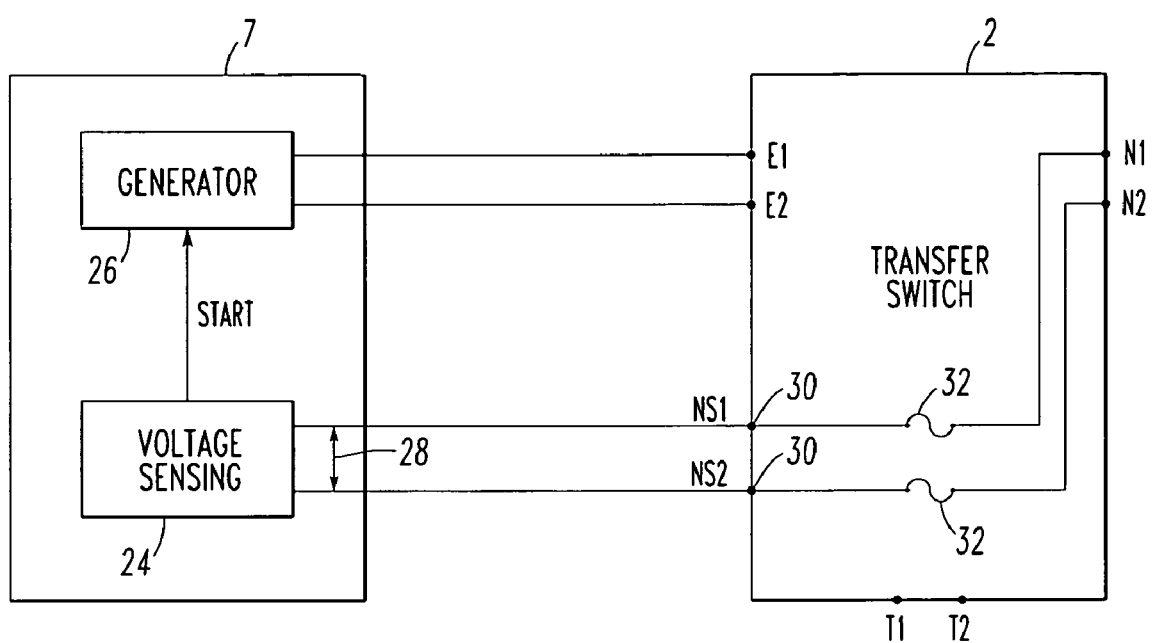
FIG. 2 is a block diagram of the transfer switch of FIGS. 1A-1B as interfaced to a voltage sensing generator power source.

As shown in FIG. 2, the second power source 7 includes a voltage sensing circuit 24 and a generator power source 26. The voltage sensing circuit 24 is adapted to input a voltage 28 from fourth terminals 30 (NS1,NS2) of the transfer switch 2 and start the generator power source 26 responsive to the voltage 28 being below a predetermined value (e.g., without limitation, about 80% of the rated voltage; a suitable voltage magnitude below the rated voltage). As shown in FIGS. 1A-1B and 2, the first terminals 4 have the voltage 28, and the fourth terminals 30 are electrically interconnected with the first terminals and output that voltage to the voltage sensing circuit 24 of the second power source 7 through fuses 32. The fourth terminals 30 include a first termination NS1 and a second termination NS2, and the first terminals 4 include a first termination N1 and a second termination N2. The first termination NS1 of the fourth terminals 30 is electrically connected to the first termination N1 of the first terminals 4 by a first one of the fuses 32, and the second termination NS2 of the fourth terminals 30 is electrically connected to the second termination N2 of the first terminals 4 by a second one of the fuses 32.

Although FIGS. 1A-1B show the generator power source 26, the transfer switch 2 may advantageously be employed with two (not shown) voltage sensing generator power sources. For example, the first power source 5 may be another generator power source adapted to input the voltage 28' from terminals 30' (ES1,ES2) through fuses 32' and start a generator (not shown) responsive to the voltage.

As shown in FIGS. 1A-1B, the control mechanism 12 includes a neutral terminal 34. As is conventional, the voltage 28 of the first terminals 4 includes a first line voltage L1 (e.g., without limitation, 120 VAC) of the first terminal or termination N1 and an opposite second line voltage L2 (e.g., without limitation, 120 VAC) of the second terminal or termination N2.

The control circuit 14 of the control mechanism 12 includes a second relay (KN) 36 adapted to be energized by the voltage L2 of the first terminals 4, a third time delay relay (TDNE) 38 including a NO contact (TDNE) 40 and a first solenoid (E) 42. The first solenoid (E) 42 is energized to cause the transfer mechanism 10 to electrically connect the second terminals 6 to the third terminals 8. The second relay (KN) 36 includes a first NC contact (KN) 44A electrically connected in series with the third time delay relay (TDNE) 38, which is adapted to be energized by the voltage 46B of the second terminals 6 when the second relay (KN) 36 is de-energized and the NC contact (KN) 44A thereof is closed. The first solenoid (E) 42 is energized when a second NC contact (KN) 44 of the second relay (KN) 36 is closed and the NO contact (TDNE) 40 of the third time delay relay (TDNE) 38 is closed. The first solenoid (E) 42 includes an auxiliary switch NO position 48 adapted to energize the first relay (KL) 16 from the voltage 46A after the second terminals 6 are electrically connected to the third terminals 8.

The control circuit 14 may initiate a transfer from the normal power source 5 to the alternate power source 7 based upon the interruption of any or all phases (e.g., voltage L1 or voltage L2) on the normal power source.

The control circuit 14 further includes a second solenoid (N) 50 adapted to be energized from the first voltage L1 of the first terminals 4 to cause the transfer mechanism 10 to electrically connect the first terminals 4 to the third terminals 8. The second solenoid (N) 50 is also adapted to be de-energized responsive to presence of the voltage 46B and absence of the second voltage L2 of the first terminals 4.

During operation, the first power source supply voltage 28 is applied to terminals N1 and N2 and the second power source supply voltage 28' is applied to terminals E1 and E2. The load is applied to terminals T1 and T2. The transfer switch control circuit 14 monitors both the first and second power sources 5,7 and automatically transfers critical load circuits between the two sources depending upon which source is available. The first power source 5 is preferred and will remain connected to the load if it is available. Preferably, the control circuit 14 includes suitable indicators, such as LEDs (not shown), to indicate when the corresponding power source is above an acceptable nominal voltage.

The time delay relay 38 (TDNE), the time delay relay 52 (TDEN), the failsafe relay 54 (KF), and the second relay 36 (KN) may be, for example, separate and distinct relay devices, as shown, or may be implemented by suitable analog, digital and/or processor-based logic (e.g., without limitation, a printed circuit board including a suitable processor (e.g., microprocessor) and/or logic circuit) (not shown).

The relay 16 (KL) is a load shed/load enable relay that sheds relatively high current, non-critical loads 21 (e.g., without limitation, air conditioners; hot tubs) and enables relatively lower current, critical loads 22 (e.g., without limitation, emergency loads) under conditions when the second power source 7 is supplying power. The end user simply electrically connects any non-essential loads, such as 21, to the NC contacts 18. When the relay 16 (KL) becomes energized upon connection to the second power source 7, the conductors electrically connected to the NC contacts 18 are de-energized, thereby removing power to the non-critical loads 21. Additionally, the relay 16 (KL) includes NO contacts 20, which may be used to power only selected critical loads, such as 22. This enables the end user to electrically connect only the loads, such as 22, that are necessary during a power outage. When the relay 16 (KL) becomes energized upon connection to second power source 7, the conductors electrically connected to the NO contacts 20 are energized, thereby powering up any critical loads, such as 22. What this means is that when the transfer switch 2 is on the second power source (e.g., generator 26) power, the relay 16 (KL) energizes, thereby causing the NO contacts 20 to close.

Although not required, the transfer switch 2 may also include a suitable transient voltage surge suppression (TVSS) circuit 55 for the first power source 5.

The power sources 5,7 and the transfer switch 2 form a power system 56.

Table 1, below, shows a truth table including the position of the main components of the transfer switch 2 during the combinations of the first and second power source availability, wherein "1" means available, energized or closed, and "0" means unavailable, de-energized or open.

TABLE 1

| S1 | S2 | S2 Connected | TDEN | TDNE | KN Relay | KN Contact | KF Relay | KF Contact | KL Relay | KL NC Contacts |
|---|---|---|---|---|---|---|---|---|---|---|
| 0 | 0 | 0 | 0 | 0 | 0 | 1 | 0 | 1 | 0 | 1 |
| 0 | 1 | 1 | 0 | 1 | 0 | 1 | 1 | 0 | 1 | 0 |
| 1 | 0 | 0 | 1 | 0 | 1 | 0 | 0 | 1 | 0 | 1 |
| 1 | 1 | 0 | 1 | 0 | 1 | 0 | 1 | 0 | 0 | 1 |

EXAMPLE

Figure 3:
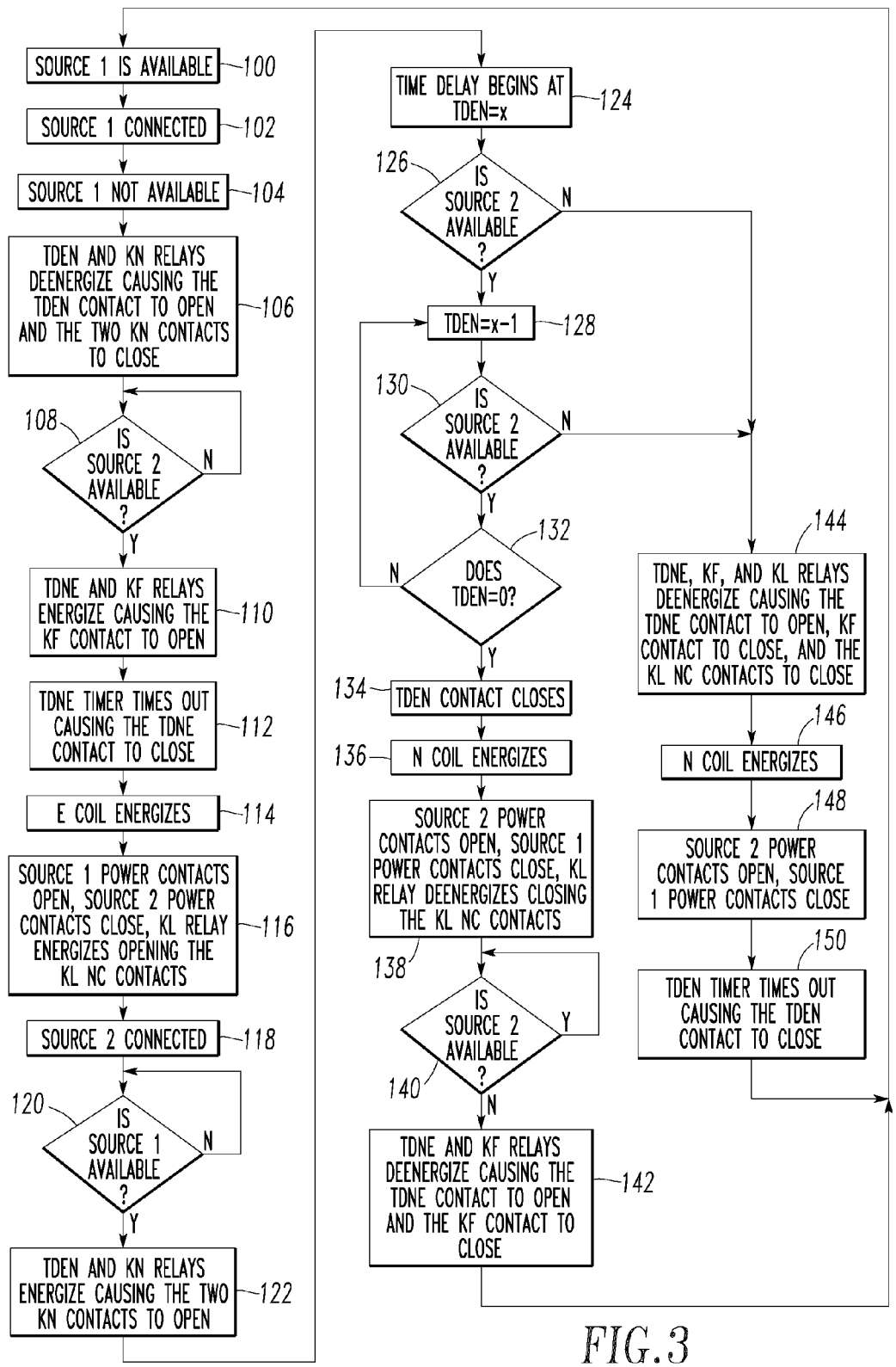
FIG. 3 is a flowchart showing the operation of the transfer switch of FIGS. 1A-1B.

Referring to FIGS. 1A-1B and 3, initially, for example, the first power source 5 is available at 100 and connected at 102, and the second power source 7 is not available and not connected. Then, at 104, the first power source 5 becomes not available and connected, and the second power source 7 remains not available and not connected. Next, at 106, the relay 52 (TDEN) and the relay 36 (KN) both de-energize causing the TDEN NO contact 57 to open and the two KN NC contacts 44,44A to close.

At 108, if the second power source 7 becomes available (or was already available), then, at 110, this causes the relay 38 (TDNE) and the relay 54 (KF) to both energize causing the KF NC contact 60 to open. The coil 50 (N) was de-energized responsive to the transfer switch 2 being connected to the normal position. Then, at 112, after a suitable TDNE time delay (e.g., without limitation, 50 seconds), the TDNE NO contact 40 closes. As a result, at 114, the coil 42 (E) energizes. At 116, this causes the first power source power contacts 62 to open and, thus, causes the first power source auxiliary switch 64 to go to its NC position 65. Also, the second power source power contacts 66 close and, thus, cause the second power source auxiliary switch 68 to go to its NO position 48. As a result, the relay 16 (KL), then, is simultaneously energized, thereby causing the KL NC contacts 18 to open and the KL NO contacts 20 to close. Here, the first power source 5 is not available and not connected, and the second power source 7 is available and connected, at 118.

Next, at 120, the first power source 5 may become available. If so, then at 122, the relay 52 (TDEN) and the relay 36 (KN) both energize causing the two KN NC contacts 44,44A to open. Next, after the suitable TDEN time delay (e.g., without limitation, 10 seconds) as measured at even steps 124-132, the TDEN NO contact 57 closes, at 134, which causes the coil 50 (N) to energize at 136. The open KN NC contact 44 de-energizes the coil 42 (E). Also, the relay 16 (KL) will then simultaneously become de-energized, which causes the KL NC contacts 18 to close and the KL NO contacts 20 to open. Further, the energized coil 50 (N) causes the second power source power contacts 66 to open and the second power source auxiliary switch 68 to go to its NC position 70, at 138. Also, the first power source power contacts 62 close and, thus, cause the first power source auxiliary switch 64 to go to the NO position 72. Here, the first power source 5 is available and connected, and the second power source 7 is available and not connected.

In the above sequence, if the second power source 7 becomes unavailable, at 130, during the timing down of the relay 52 (TDEN), then that is a failsafe condition and the below sequence occurs, which is the same sequence that occurs, at 142, after the second power source 7 becomes unavailable. At 130, the second power source 7 fails during the TDEN time delay, when the first power source 5 becomes available. At 144, the relay 52 (TDEN) and the relay 36 (KN) both energize causing the two KN NC contacts 44,44A to open. Also, as a result of the second power source 7 failure, the TDNE, KF and KL relays 38, 54 and 16, respectively, all de-energize, which causes the TDNE NO contact 40 to open, the KF NC contact 60 to close, and the KL NC contacts 18 to close. The coil 42 (E) was de-energized responsive to the transfer switch 2 being connected to the emergency position. The KF NC contact 60 being closed causes the coil 50 (N) to be energized, at 146. Next, at 148, the energized coil 50 (N) causes the second power source power contacts 66 to open, which causes the second power source auxiliary switch 68 to go to its NC position 70. Also, the first power source power contacts 62 close and, thus, cause the first power source auxiliary switch 64 to go to the NO position 72. Then, after the TDEN time delay, at 150, the TDEN NO contact 57 closes. Here, the first power source 5 is available 100 and connected 102, and the second power source 7 is not available and not connected.

Otherwise, at 140, when the first power source 5 is available and connected, and the second power source 7 becomes unavailable, at 142, the relay 38 (TDNE) and the relay 54 (KF) are both de-energized. This causes the TDNE NO contact 40 to open and the KF NC contact 60 to close. Here, the first power source 5 is available 100 and connected 102, and the second power source 7 is not available and not connected. Next, when the first power source 5 becomes unavailable, at 104, the sequence of this example is repeated.

Although alternating current (AC) power sources 5,7 are disclosed which include a first line (e.g., first line L1; N1; E1; T1), a second line (e.g., second line L2, which is opposite in phase with respect to the first line L1; N2; E2; T2) and a common neutral 34, it will be appreciated that the teachings of the invention are applicable to a wide range of power systems (e.g., single phase; single phase with a switched neutral).

Although an electromechanical relay 16 is disclosed, the teachings of the invention are applicable to other suitable relays (e.g., without limitation, solid state switches or FET relays having NC and/or NO output contacts).

The disclosed transfer switch 2 is useful for applications in which insufficient generator capacity is available to run less than all of the desired loads. The NO contacts 20 of the transfer switch 2 enable loads, such as 22, while the NC contacts 18 permit loads, such as 21, to be shed. This is useful in, for example, powering emergency lighting, powering relatively smaller cooling and/or heating devices in place of relatively larger air conditioners and/or furnaces, and powering other emergency-only related circuits.

The disclosed multi-purpose transfer switch 2 is adapted for use with dual utility sources, a single utility source and a voltage sensing generator, or two generators, one of which is voltage sensing. This may be used, for example, in residential or light commercial applications to provide the end user with the flexibility to choose suitable power supply sources that can be used as primary and emergency sources. The transfer switch 2 includes extra terminals 30 adapted to output the voltage 28 of the utility power source 5 to the voltage sensing generator 7. Also, by eliminating redundant voltage sensing on the transfer switch control mechanism 12 and by eliminating engine start contacts in the transfer switch 2, a reduced cost transfer switch is provided.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A transfer switch comprising:
   first terminals adapted to input power from a first power source;
   second terminals adapted to input power from a second power source;
   third terminals adapted to output power to a first load;
   a transfer mechanism adapted to selectively electrically connect either said first terminals or said second terminals to said third terminals; and
   a control mechanism cooperating with said first terminals, said second terminals and said transfer mechanism to cause said transfer mechanism to electrically connect one of: said first terminals to said third terminals or said second terminals to said third terminals, said control mechanism comprising a control circuit and a relay including at least one normally closed contact and at least one normally open contact, said relay being de-energized by said control circuit responsive to said first terminals being electrically connected to said third terminals, said relay being energized by said control circuit responsive to said second terminals being electrically connected to said third terminals, said at least one normally closed contact being adapted to shed a corresponding at least one second load when said relay is energized, and said at least one normally open contact being adapted to enable a corresponding at least one third load when said relay is energized, wherein said relay is a first relay; wherein said first terminals have a first voltage; wherein said second terminals have a second voltage; and wherein said control circuit further comprises a second relay adapted to be energized by the first voltage of said first terminals, and a third relay including a normally open contact and a first solenoid, said second relay including a first normally closed contact electrically connected in series with said third relay, said third relay being adapted to be energized by the second voltage of said second terminals when said second relay is de-energized and said first normally closed contact thereof is closed, said first solenoid being energized when a second normally closed contact of said second relay is closed and the normally open contact of said third relay is closed, said first solenoid including an auxiliary switch contact adapted to energize said first relay from the second voltage of said second terminals after said second terminals are electrically connected to said third terminals.

2. The transfer switch of claim 1 wherein said control circuit further comprises a second solenoid adapted to be energized from the first voltage of said first terminals to cause said transfer mechanism to electrically connect said first terminals to said third terminals, and adapted to be de-energized responsive to presence of said second voltage and absence of said first voltage; and wherein said first solenoid is energized to cause said transfer mechanism to electrically connect said second terminals to said third terminals.

3. A power system comprising:
   a first power source;
   a second power source comprising a voltage sensing circuit and a generator power source, said voltage sensing circuit being adapted to input a voltage and start said generator power source responsive to said voltage; and
   a transfer switch comprising:
      first terminals structured to input power from said first power source, said first terminals having said voltage,
      second terminals structured to input power from said second power source,
      third terminals adapted to output power to a load,
      fourth terminals outputting the voltage of said first terminals to the voltage sensing circuit of said second power source,
      a transfer mechanism adapted to selectively electrically connect either said first terminals or said second terminals to said third terminals, and
      a control mechanism cooperating with said first terminals, said second terminals and said transfer mechanism to cause said transfer mechanism to electrically connect one of: said first terminals to said third terminals or said second terminals to said third terminals, wherein said fourth terminals include a first termination and a second termination; wherein said first terminals include a first termination and a second termination; wherein the first termination of said fourth terminals is electrically connected to the first termination of said first terminals by a first fuse; and wherein the second termination of said fourth terminals is electrically connected to the second termination of said first terminals by a second fuse.

4. A transfer switch comprising:
   first terminals adapted to input power from a first power source;
   second terminals adapted to input power from a second power source;
   third terminals adapted to output power to a first load;
   a transfer mechanism adapted to selectively electrically connect either said first terminals or said second terminals to said third terminals; and
   a control mechanism cooperating with said first terminals, said second terminals and said transfer mechanism to cause said transfer mechanism to electrically connect one of: said first terminals to said third terminals or said second terminals to said third terminals, said control mechanism comprising a control circuit and a relay, said relay being de-energized by said control circuit responsive to said first terminals being electrically connected to said third terminals, said relay being energized by said control circuit responsive to said second terminals being electrically connected to said third terminals, wherein said relay is a first relay; wherein said first terminals have a first voltage; wherein said second terminals have a second voltage; and wherein said control circuit further comprises a second relay adapted to be energized by the first voltage of said first terminals, and a third relay including a normally open contact and a first solenoid, said second relay including a first normally closed contact electrically connected in series with said third relay, said third relay being adapted to be energized by the second voltage of said second terminals when said second relay is de-energized and said first normally closed contact thereof is closed, said first solenoid being energized when a second normally closed contact of said second relay is closed and the normally open contact of said third relay is closed, said first solenoid including an auxiliary switch contact adapted to energize said first relay from the second voltage of said second terminals after said second terminals are electrically connected to said third terminals.

5. The transfer switch of claim 4 wherein said control circuit further comprises a second solenoid adapted to be energized from the first voltage of said first terminals to cause said transfer mechanism to electrically connect said first terminals to said third terminals, and adapted to be de-energized responsive to presence of said second voltage and absence of said first voltage; and wherein said first solenoid is energized to cause said transfer mechanism to electrically connect said second terminals to said third terminals.

\* \* \* \* \*